United States Patent [19]

Detzel Roger A. et al.

[11] Patent Number: 4,938,171
[45] Date of Patent: Jul. 3, 1990

[54] TRANSPORT CONDUIT FOR HOT PARTICULATE MATERIAL

[75] Inventors: Detzel Roger A., Norton; Paul S. Knoebel, Clinton; David J. Walker, Wadsworth, all of Ohio

[73] Assignee: The Babcock & Wilcox Company, New Orleans, La.

[21] Appl. No.: 449,022

[22] Filed: Dec. 12, 1989

[51] Int. Cl.⁵ .............................................. F22B 1/00
[52] U.S. Cl. .................................. 122/4 D; 110/245; 165/104.16; 422/145
[58] Field of Search .................. 122/4 D; 110/245; 165/104.16; 431/7; 422/145; 251/369, 901

[56] References Cited

U.S. PATENT DOCUMENTS

| | | | |
|---|---|---|---|
| 4,686,939 | 8/1987 | Stromberg | 122/4 D |
| 4,709,622 | 12/1987 | Rawdon | 122/4 D |
| 4,709,663 | 12/1987 | Larson et al. | 122/4 D |
| 4,860,694 | 8/1989 | Walker | 122/4 D |

Primary Examiner—Edward G. Favors
Attorney, Agent, or Firm—Robert J. Edwards; Michael L. Hoelter

[57] ABSTRACT

This invention pertains to a segmented insert installed within the horizontal conduit of a non-mechanical means (such as an L-valve) for controlling the external flow of particulate material recycled to a fluidized bed combustor. The segmented insert is insulated to protect the horizontal conduit and the individual segments are joined together by a combination of a collar and hinge means. This method of coupling retains the co-axial alignment of the individual segments for leak-free operations while also enabling them to move or pivot independent of each other while still being connected together. Such independent movement is necessary for stress release purposes during high temperature operation.

12 Claims, 2 Drawing Sheets

TRANSPORT CONDUIT FOR HOT PARTICULATE MATERIAL

FIELD OF THE INVENTION

This invention pertains to the transportation of hot particulate material and more particularly to a conduit for recycling such material (at a temperature of approximately 1600 degrees Fahrenheit or more) using a non-mechanical means of control such as an L-valve.

BACKGROUND OF THE INVENTION

The use of L-valves or other non-mechanical means for controlling the flow rate of particulate material in circulating fluidized bed boilers is well known. However, when the particulate material reaches or exceeds a temperature of about 900 degrees, serious problems occur due to the thermal gradients involved. During periods of sporadic use, the material in the horizontal transport conduit will have had time to cool down. Then, when flow is again required, the new hot material entering the horizontal conduit causes extreme cases of longitudinal and circumferential temperature gradients to occur within the conduit. If frequently repeated, the conduit will fail due to buckling, twisting or tearing as a result of its expansion and contraction. Welds have been known to fail due to the tremendous forces involved that rapidly build-up. Temperature swings on the order of several hundred degrees over a period of only a few minutes have been recorded. Also, vastly different temperature readings oftentimes occur on opposite sides of the conduit. Such patterns of distortion will lead to failure of the conduit itself.

Attempts to insulate the horizontal conduit have been to no avail as this only protects the outer casing surrounding the conduit (if at all) and not the conduit itself which is in direct contact with the hot particulate material. Additionally, attempts to secure this conduit to its outer casing have also failed due to the buckling and/or required movement of the conduit under such conditions. Oftentimes, the temperature gradients in the conduit from top to bottom cause the conduit to bend into an arc or a 'banana' shape thereby tearing itself loose inside the outer casing. As a result, the gas and solid matter being recirculated is no longer contained but instead begins to leak from the conduit and potentially can eventually escape from within the outer casing.

It is thus an object of this invention to provide a transport conduit that can accommodate extreme temperature gradients without releasing any contained material. Another object of this invention is to provide a transport conduit that can 'flex' as needed while still remaining intact within an outer casing. Still another object of this invention is to provide a transport conduit having low thermal mass which allows for relatively rapid heat-up and cool down for more even temperature distribution. Yet another object of this invention is to provide a means that will buffer the conduit from the extreme temperature levels, thermal transients, and differentials that arise during the transport of the hot particulate material. These and other features of this invention will become obvious upon further investigation.

SUMMARY OF THE INVENTION

This invention pertains to an insert positioned within the horizontal conduit having insulation packed within the annular region between the two. The insert is segmented with adjacent segments co-axially positioned by a collar that is secured to one segment but which extends around an end region of the adjacent segment. This permits the adjacent segment to flex or move while remaining in longitudinal alignment with the first segment. Hinge means also secure a portion of adjacent segments together thereby permitting the segments to pivot with respect to each other while remaining connected together.

DETAILED DESCRIPTION OF THE DRAWINGS

Figure 1:
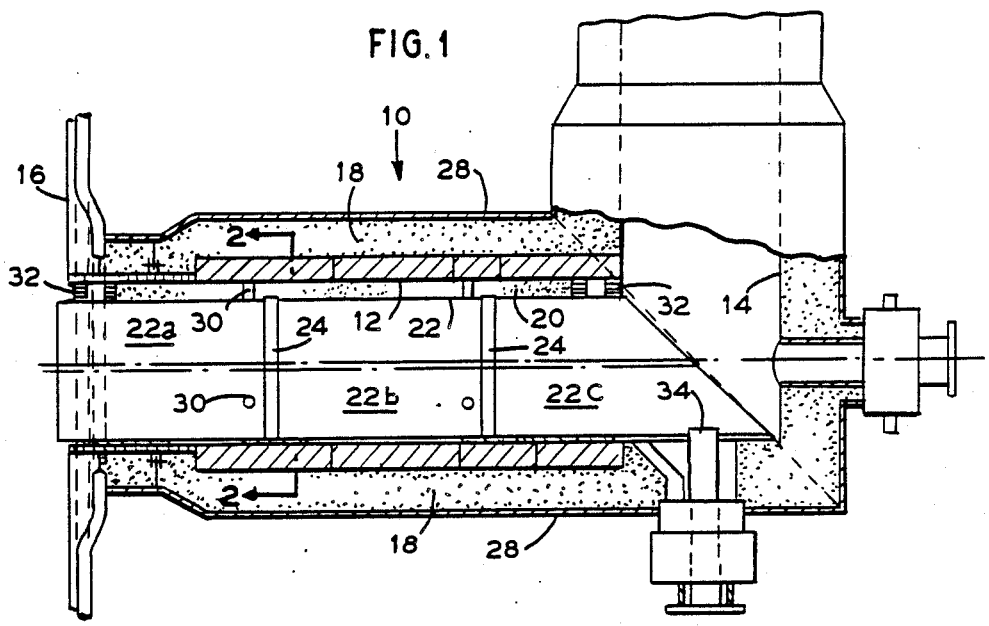
FIG. 1 is a side view, partially broken away, of the non-mechanical means for conveying hot particulate material (an L-valve) and its corresponding horizontal conduit.

Referring initially to FIG. 1, there is shown non-mechanical or L-valve assembly 10 with horizontal conduit 12 and vertical conduit 14. Horizontal conduit 12 opens to furnace 16 and conveys particulate material and flue gas to furnace 16 from vertical conduit 14. Because of the high temperatures involved (on the order of 1600 degrees F. or more), horizontal conduit 12 is normally constructed of stainless steel and is encircled with insulation 18.

To protect horizontal conduit 12 from extreme temperature levels, gradients, and transients, the inner surface of conduit 12 is lined with insulation 20. Insert 22 is then installed within insulation 20 and horizontal conduit 12 to protect insulation 20 from the particulate material. Insulation 20 is oftentimes of a different composition and make-up than insulation 18 which generally consists of blanket, board and poured-in-place refractory. Insulation 20, on the other hand is a compressible high temperature insulation which can accommodate the flexing, bowing, or humping of insert 22 which will occur due to the severe top to bottom temperature differentials that arise during operation.

Figure 4:
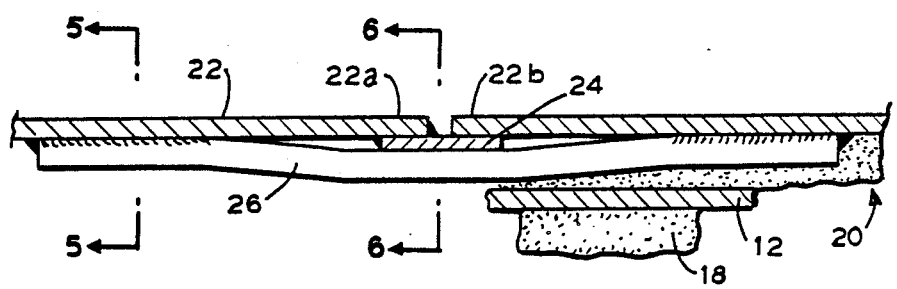
FIG. 4 is a sectional view, partially broken away, taken along lines 4—4 of FIG. 2.
Figure 3:
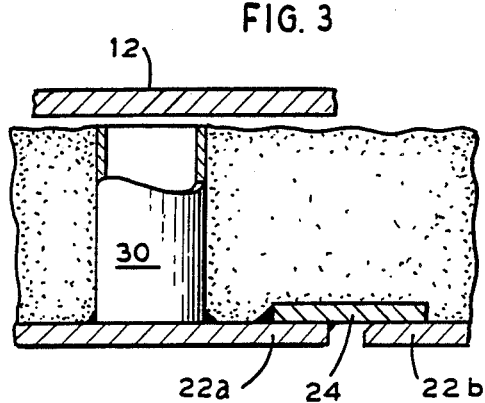
FIG. 3 is a sectional view, partially broken away, taken along lines 3—3 of FIG. 2.

Insert 22 is not of one long continuous length of pipe otherwise the problems normally associated with horizontal conduit 12 would also occur with insert 22. Instead, insert 22 is segmented with three segments, 22a, 22b, and 22c being illustrated in FIG. 1. Of course, more or fewer segments may be used as needed. These segments 22a, 22b, and 22c remain in longitudinal alignment in view of collar 24 welded to the end of one of the two adjacent segments as shown in FIGS. 3 and 4. Since collar 24 is welded to the outside circumference of one segment (segment 22a) and extends beyond the end of this segment and overlaps an adjacent segment (segment 22b), this adjacent segment can slide within collar 24 while remaining axially aligned with the first segment. Generally, there is a clearance of only about 1/32 of an inch between collar 24 and the adjacent segment. Collar 24 insures that each of segments 22a, 22b and 22c may independently move with respect to each other while still remaining in sufficient axial alignment to transport the particulate material through them. Also, the close tolerance between collar 24 and the adjacent segment insures that minimal or no particulate material and little flue gas will escape from within insert 22 as the individual segments flex due to the high temperatures involved.

Figure 5:
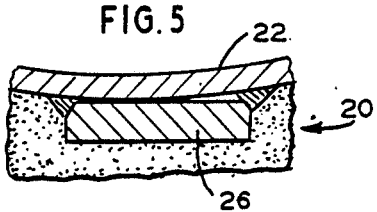
FIG. 5 is a sectional view, partially broken away, taken along lines 5—5 of FIG. 4.
Figure 6:
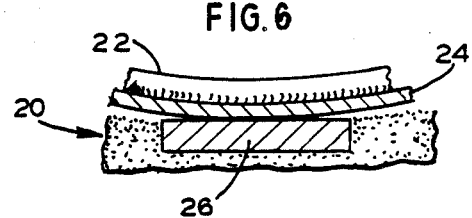
FIG. 6 is a sectional view, partially broken away, taken along lines 6—6 of FIG. 4.

To maintain the proper positioning of segments 22a, 22b and 22c during their expansion and contraction, hinge 26 is secured between adjacent segments along their bottom. As shown in FIGS. 4, 5 and 6, hinge 26 is an elongated strip of metal bent around collar 24 that is welded to adjacent segments 22a and 22b. In this fashion, segments 22a and 22b are free to flex, bend or pivot as needed while still being connected to each other. Thus, each of segments 22a, 22b and 22c are able to bow or bend into the shape of a banana, or expand or contract both axially and circumferentially as the need arises. Insulation 20, being of the compressible type, will consequently conform to whatever shape insert 22 takes thereby protecting and insulating horizontal conduit 12 and outer casing 28.

Figure 2:
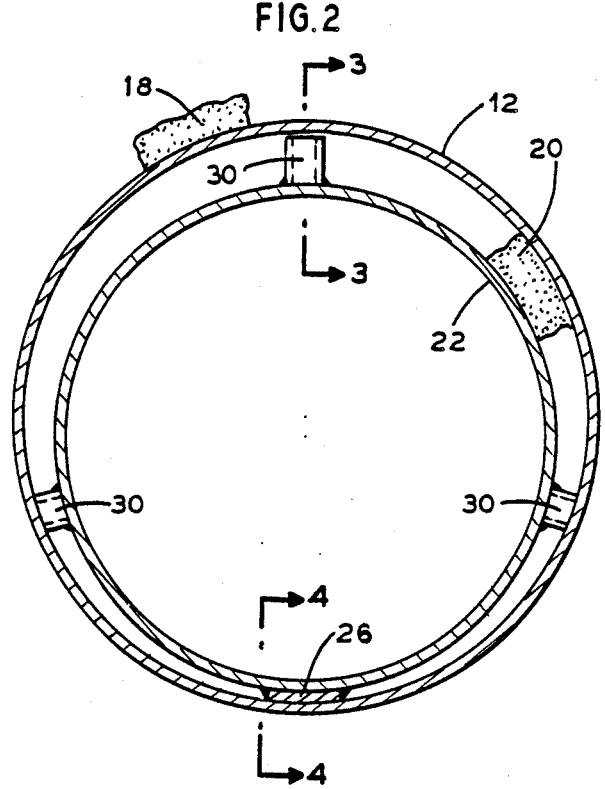
FIG. 2 is a sectional view, partially broken away, taken along lines 2—2 of FIG. 1.

As can be seen in FIG. 2, insert 22 and horizontal conduit 12 are axially offset with respect to each other. The eccentric location of insert 22 reduces the top to bottom temperature differential in horizontal conduit 12 because of the flow characteristics of the particulate material. During operation, more flow occurs along the top of insert 22 than along the bottom. Consequently, the temperature along the bottom of insert 22 closely conforms to the temperature of the relatively stagnant and cooled solids while the temperature along the top of insert 22 closely conforms to the temperature of the newly recirculated and hotter flue gas. Thus, due to the eccentric location of insert 22, the hotter upper portion of insert 22 is positioned closer to the center of horizontal conduit 12 thereby increasing its distance from the upper portion of horizontal conduit 12 as well as providing for more insulative covering.

Alignment guides 30 are secured along the circumference of insert 22 to restrain insert 22 in place. As shown, they are welded to insert 22 and located adjacent to one end of each segment thereby enabling the other end to freely move or flex as needed. As shown in FIG. 3 and when insert 22 is positioned within horizontal conduit 12, the upper guides 30 do not engage or contact conduit 12. Instead, there is a small gap between the two to allow for the more rapid expansion of insert 22 than of conduit 12. Alignment guides 30 function to retain insert 22 in its eccentric location with respect to horizontal conduit 12.

Additionally, segment 22c is further secured in position by pin 34 that extends through an opening in the bottom of segment 22c. Pin 34 secures segment 22c to L-valve assembly 10 and prevents segment 22c (and consequently segments 22a and 22b as well) from shifting toward the furnace and thus departing the L-valve or from rotating inside conduit 12.

Packing 32 is secured around the opposite ends of insert 22 to prevent the particulate material and the flue gas from engaging insulation 20 and possibly destroying it. Packing 32 also prevents the aeration gases from L-valve 10 and vertical conduit 14 from passing through insulation 20 thereby by-passing insert 22. Likewise the close clearance between collar 24 and its adjacent segment prevents leakage from occurring from between adjacent segments 22a, 22b, or 22c.

What is claimed as invention is:

1. An apparatus for transporting hot particulate material in a circulating fluidized bed boiler via non-mechanical means comprising:
    a. an insulated generally horizontal conduit extending to a furnace from said non-mechanical means;
    b. an insulated insert positioned within said horizontal conduit said insert being segmented;
    c. a collar secured to an end region of one insert segment and extending beyond an end region of an adjacent insert segment, said collar being sized to closely fit around said adjacent segment while enabling said adjacent segment to freely move longitudinally with respect to said first insert segment;
    d. hinge means for pivotally securing a portion of adjacent said insert segments together, said hinge means enabling said segments to pivot with respect to each other while remaining secured together; and,
    e. positioning means for accurately aligning and positioning said segments with respect to said horizontal conduit.

2. The apparatus as set forth in Claim 1 wherein said insert is eccentrically positioned within said horizontal conduit, said insert being located closer to the bottom of said horizontal conduit than the top.

3. The apparatus as set forth in Claim 2 wherein said hinge means comprise a metal strip securing said adjacent segments together, said strip being secured to a bottom region of said segments.

4. The apparatus as set forth in Claim 3 wherein said collar is configured to provide a gap of approximately 1/32nd of an inch between itself and said adjacent segment.

5. An insert for conveying hot particulate material in a circulating fluidized bed boiler having a horizontal conduit connecting between an L-valve and a furnace comprising:
    a. a segmented insert sized to fit within said horizontal conduit;
    b. compressible insulation positioned within the annular region between said insert and said horizontal conduit;
    c. hinge means for pivotally securing adjacent insert segments together, said hinge means being attached to a lower region of said adjacent segments;
    d. collar means for axially aligning said adjacent insert segments, said collar means being secured to one said segment and extending around an end region of an adjacent said segment;
    e. support means for supporting and positioning said segmented insert within said horizontal conduit; and,
    f. sealing means for sealing the ends of said annular region and for protecting the insulation therein from the conveyed material.

6. The apparatus as set forth in Claim 5 wherein said insert is eccentrically located within said horizontal conduit, said insert being offset towards the bottom of said horizontal conduit.

7. The apparatus as set forth in Claim 6 wherein said hinge means comprise a metal strip pivotally securing said adjacent segments together, said strip being secured to the bottom of said adjacent segments.

8. The apparatus as set forth in Claim 7 wherein said collar means comprise a collar sized slightly larger than the outside diameter of said adjacent insert segment thereby containing said conveyed material therein.

9. The apparatus as set forth in Claim 8 wherein said collar is spaced from said adjacent insert segment approximately 1/32nd of an inch.

10. The apparatus as set forth in Claim 8 wherein said support means comprise members radiating away from said insert that extend across said annular region to engage said horizontal conduit, said members maintaining the eccentric orientation of said segmented insert with respect to said horizontal conduit.

11. The apparatus as set forth in Claim 10 wherein said sealing means comprise packing material for packing and restraining said insulation within said annular region.

12. The apparatus as set forth in Claim 11 wherein said members radiating from said insert are secured to the said segment adjacent said collar.

* * * * *